US012621021B2

(12) United States Patent
Hsu et al.

(10) Patent No.: US 12,621,021 B2
(45) Date of Patent: May 5, 2026

(54) ETHERNET DEVICE THAT PERFORMS CABLE DIAGNOSIS BY USING IEEE 802.3 COMPLIANT WAVEFORM AND ASSOCIATED ETHERNET CABLE DIAGNOSIS METHOD

(71) Applicant: Airoha Technology Corp., Hsinchu City (TW)

(72) Inventors: Chia-Hsing Hsu, New Taipei City (TW); Wei-Ling Li, Chiayi County (TW)

(73) Assignee: Airoha Technology Corp., Hsinchu City (TW)

( * ) Notice: Subject to any disclaimer, the term of this patent is extended or adjusted under 35 U.S.C. 154(b) by 326 days.

(21) Appl. No.: 18/507,106

(22) Filed: Nov. 13, 2023

(65) Prior Publication Data
US 2025/0158656 A1    May 15, 2025

(51) Int. Cl.
*H04B 3/493*          (2015.01)

(52) U.S. Cl.
CPC .................................... *H04B 3/493* (2015.01)

(58) Field of Classification Search
CPC . H04B 3/02; H04B 3/46; H04B 3/493; H04B 1/02; H04B 1/04; H04B 1/0466; H04B 1/0483; H04B 10/07; H04B 10/071; H04B 10/075; H04B 10/077; H04B 10/0771; H04B 10/0791; H04B 43/00; H04B 43/50; H04L 25/02; H04L 25/08
See application file for complete search history.

(56) References Cited

U.S. PATENT DOCUMENTS

| | | | | |
|---|---|---|---|---|
| 6,820,225 | B1 * | 11/2004 | Johnson | .................. H04L 43/50 |
| | | | | 714/715 |
| 6,980,007 | B1 * | 12/2005 | Lo | ......................... G01R 31/088 |
| | | | | 324/543 |
| 7,164,274 | B2 * | 1/2007 | Pharn | ...................... G01R 31/11 |
| | | | | 324/533 |
| 7,292,596 | B1 * | 11/2007 | Campana | ............ G06F 13/4072 |
| | | | | 710/10 |
| 7,358,745 | B1 * | 4/2008 | Lo | ........................... H04L 43/50 |
| | | | | 324/533 |
| 7,375,532 | B1 * | 5/2008 | Lo | ........................... H04B 3/46 |
| | | | | 324/543 |
| 8,582,443 | B1 * | 11/2013 | Sun | ......................... G01R 31/11 |
| | | | | 370/242 |
| 8,829,917 | B1 * | 9/2014 | Lo | ........................... H04L 43/50 |
| | | | | 370/465 |

(Continued)

FOREIGN PATENT DOCUMENTS

| | | |
|---|---|---|
| EP | 1 193 907 B1 | 8/2007 |
| EP | 3 968 000 A1 | 3/2022 |

*Primary Examiner* — James M Perez
(74) *Attorney, Agent, or Firm* — Winston Hsu

(57) ABSTRACT
An Ethernet device includes a link test pulse (LTP) generator circuit, a hybrid circuit, a transmit (TX) circuit, a receive (RX) circuit, and a post-processing circuit. The LTP generator circuit generates an LTP signal that is compliant with an IEEE 802.3 standard. The TX circuit transmits the LTP signal to an Ethernet cable through the hybrid circuit. The RX circuit receives an RX signal from the hybrid circuit during a period in which the LTP signal is transmitted through the hybrid circuit. The post-processing circuit performs a cable diagnosis of the Ethernet cable according to the RX signal.

18 Claims, 8 Drawing Sheets

(56)  References Cited

U.S. PATENT DOCUMENTS

| | | | |
|---|---|---|---|
| 9,143,236 B1 * | 9/2015 | Bartur | G01M 11/3145 |
| 9,887,880 B1 * | 2/2018 | Lo | H04L 41/0866 |
| 11,121,782 B2 * | 9/2021 | Zang | G01R 31/088 |
| 11,228,365 B1 * | 1/2022 | Desplat | G01M 11/3109 |
| 11,711,142 B2 * | 7/2023 | Desplat | G01M 11/3172 |
| | | | 398/21 |
| 12,058,083 B2 * | 8/2024 | Wang | H04L 5/1415 |
| 12,120,213 B2 * | 10/2024 | Hsu | H04J 3/0697 |
| 2002/0041571 A1 * | 4/2002 | Huff | H04L 49/351 |
| | | | 370/465 |
| 2002/0123350 A1 * | 9/2002 | Bui | H04L 43/50 |
| | | | 455/450 |
| 2007/0230555 A1 * | 10/2007 | Peleg | H04B 3/48 |
| | | | 375/232 |
| 2008/0225894 A1 * | 9/2008 | Powell | H04L 12/413 |
| | | | 370/477 |
| 2011/0096793 A1 * | 4/2011 | Bar-Niv | H04L 12/66 |
| | | | 370/463 |
| 2014/0321298 A1 * | 10/2014 | Chow | H04L 41/26 |
| | | | 370/252 |
| 2015/0054488 A1 * | 2/2015 | Zhang | H04B 3/46 |
| | | | 324/76.11 |
| 2018/0351778 A1 * | 12/2018 | Nakamura | H04L 69/163 |
| 2019/0386851 A1 * | 12/2019 | Dai | H04L 49/3054 |
| 2020/0386653 A1 * | 12/2020 | Perron | G01M 11/3109 |
| 2022/0123833 A1 * | 4/2022 | Desplat | G01M 11/3145 |
| 2022/0166461 A1 * | 5/2022 | Sun | H04B 3/46 |
| 2023/0318990 A1 * | 10/2023 | Calciu | H04L 49/3054 |
| | | | 709/224 |
| 2023/0388099 A1 * | 11/2023 | Hsu | H04J 3/0697 |
| 2025/0158656 A1 * | 5/2025 | Hsu | H04L 43/50 |

* cited by examiner

ETHERNET DEVICE THAT PERFORMS CABLE DIAGNOSIS BY USING IEEE 802.3 COMPLIANT WAVEFORM AND ASSOCIATED ETHERNET CABLE DIAGNOSIS METHOD

BACKGROUND OF THE INVENTION

1. Field of the Invention

The present invention relates to a cable diagnosis design, and more particularly, to an Ethernet device that performs a cable diagnosis by using an IEEE 802.3 compliant waveform and an associated Ethernet cable diagnosis method.

2. Description of the Prior Art

The Ethernet network might have a link failure issue during network establishment due to many reasons. For example, the link failure issue may result from an Ethernet cable being unplugged or a damaged Ethernet cable being an open or short circuit. It becomes much more difficult for troubleshooting due to the complexity of large Ethernet topology. In this case, a cable diagnosis algorithm is an optimal solution for Ethernet networking troubleshooting. A traditional cable diagnosis algorithm may require a transmitter to send some specific waveforms (e.g., multiple step waves or pseudo random signals) which are not compliant with IEEE 802.3 Auto-Negotiation (AN) and may cause some inter-operability-test issue. Thus, there is a need for an innovative Ethernet cable diagnosis design which does not affect the IEEE 802.3 Ethernet system.

SUMMARY OF THE INVENTION

One of the objectives of the claimed invention is to provide an Ethernet device that performs a cable diagnosis by using an IEEE 802.3 compliant waveform and an associated Ethernet cable diagnosis method.

According to a first aspect of the present invention, an exemplary Ethernet device is disclosed. The exemplary Ethernet device includes a link test pulse (LTP) generator circuit, a hybrid circuit, a transmit (TX) circuit, a receive (RX) circuit, and a post-processing circuit. The LTP generator circuit is arranged to generate an LTP signal that is compliant with an IEEE 802.3 standard. The TX circuit is arranged to transmit the LTP signal to an Ethernet cable through the hybrid circuit. The RX circuit is arranged to receive an RX signal from the hybrid circuit during a period in which the LTP signal is transmitted through the hybrid circuit. The post-processing circuit is arranged to perform a cable diagnosis of the Ethernet cable according to the RX signal.

According to a second aspect of the present invention, an exemplary Ethernet cable diagnosis method is disclosed. The exemplary Ethernet cable diagnosis method includes: generating a link test pulse (LTP) signal that is compliant with an IEEE 802.3 standard; transmitting the LTP signal to an Ethernet cable through a hybrid circuit; receiving a receive (RX) signal from the hybrid circuit during a period in which the LTP signal is transmitted through the hybrid circuit; and performing a cable diagnosis of the Ethernet cable according to the RX signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
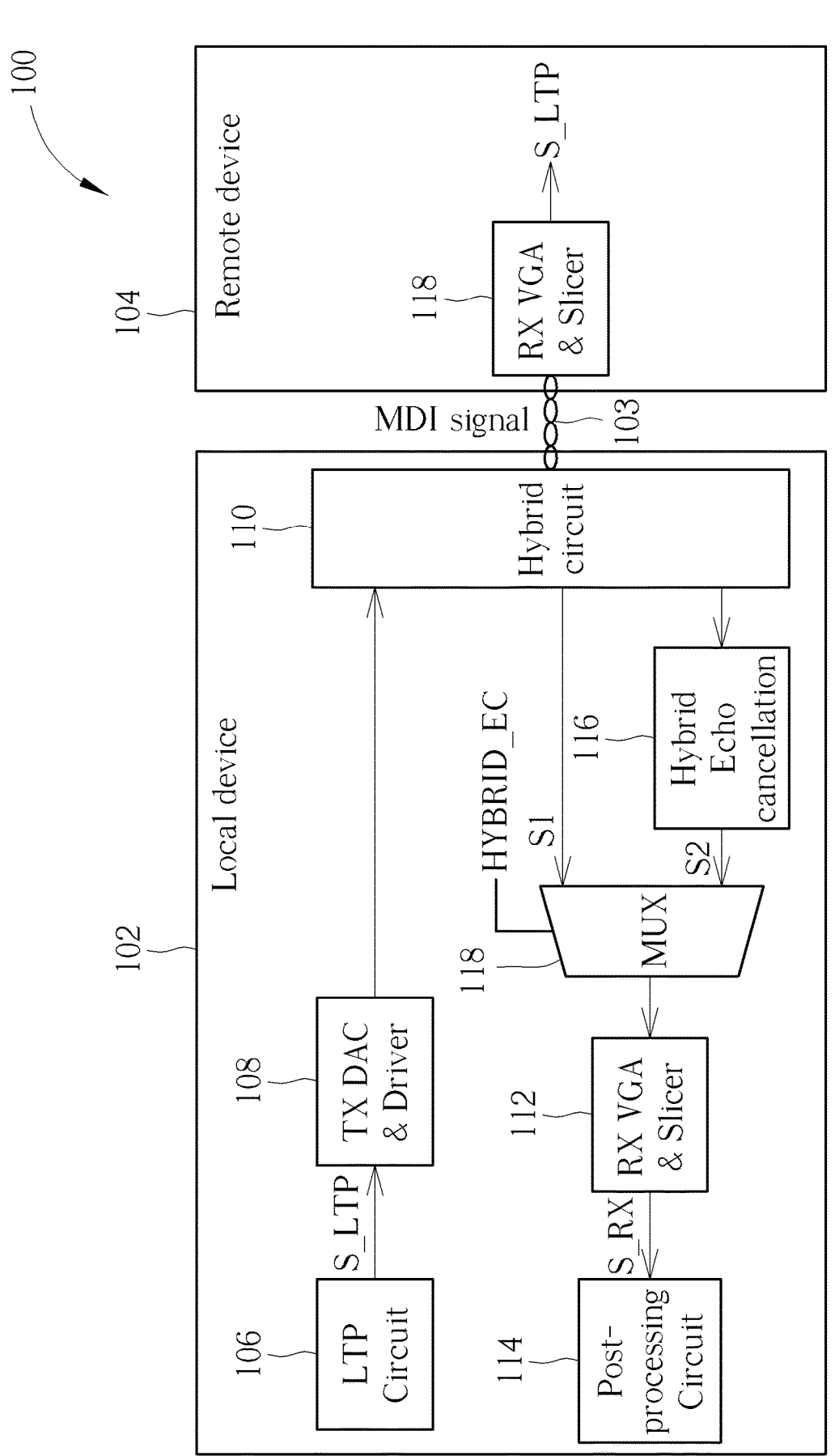
FIG. 1 is a diagram illustrating an Ethernet network system according to an embodiment of the present invention.

FIG. 1 is a diagram illustrating an Ethernet network system according to an embodiment of the present invention. The Ethernet network system 100 may include two Ethernet devices acting as a local device 102 and a remote device 104. The local device 102 supports the proposed real-time Ethernet cable diagnosis function which can be in operation during Auto-Negotiation (AN) or 10BASE-T idle mode. In this embodiment, the local device 102 includes a link test pulse (LTP) generator circuit 106, a transmit (TX) circuit (which includes a TX digital-to-analog converter and driver circuit (labeled by "TX DAC & Driver") 108), a hybrid circuit 110, a receive (RX) circuit (which includes an RX variable gain amplifier and slicer (labeled by "RX VGA & Slicer) 112), a post-processing circuit 114, a hybrid echo cancellation circuit (labeled by "Hybrid echo cancellation") 116, and a multiplexer (labeled by "MUX") 118. The remote device 104 includes an RX circuit (which includes an RX variable gain amplifier and slicer (labeled by "RX VGA & Slicer) 118). It should be noted that only the components pertinent to the present invention are shown in FIG. 1. In practice, the local device 102 may include additional components to achieve other functions, and/or the remote device 104 may include additional components to achieve other functions. Furthermore, the hybrid echo cancellation circuit 116 and the multiplexer 118 are illustrated as external components of the hybrid circuit 110. In some embodiments of the present invention, the hybrid echo cancellation circuit 116 and the multiplexer 118 may be integrated within the hybrid circuit 110. To put it simply, the present invention has no limitations on the implementation of the hybrid circuit 110 and the hybrid echo cancellation circuit 116.

Figure 2:
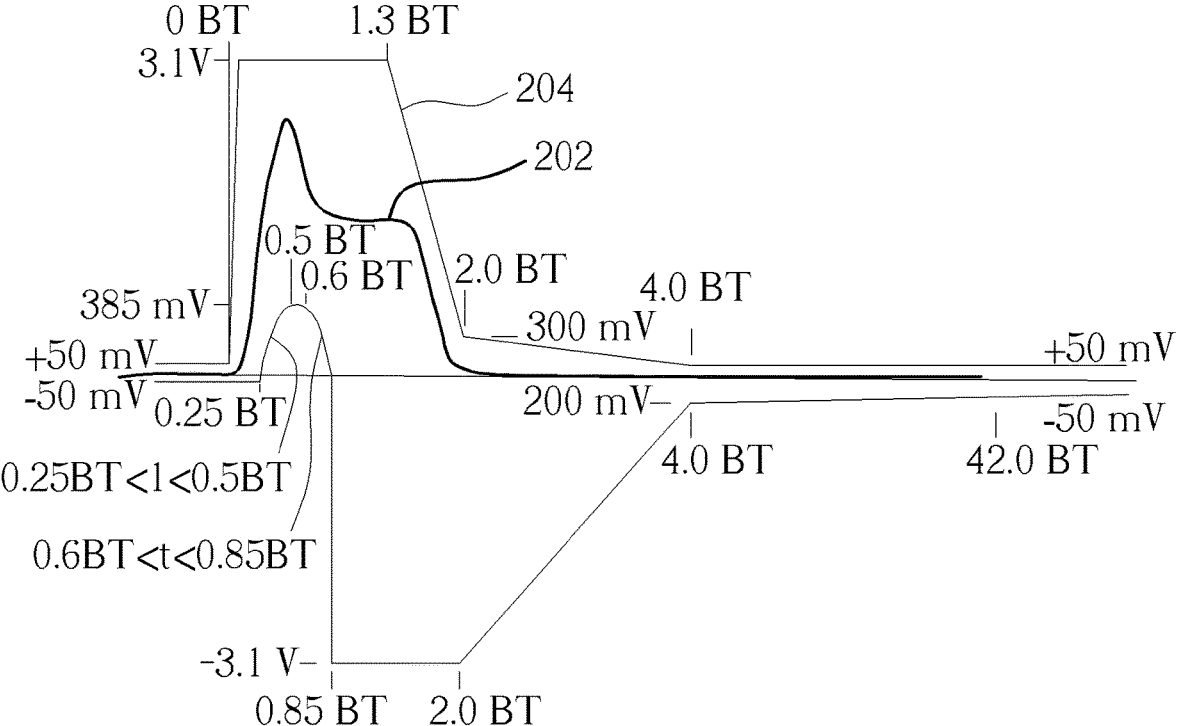
FIG. 2 is a diagram illustrating an LTP waveform represented by the LTP signal S_LTP generated from the LTP generator circuit shown in FIG. 1.

The LTP generator circuit 106 is arranged to generate an LTP signal S_LTP (which is a digital signal representative of an LTP waveform), where the LTP signal S_LTP is compliant with an IEEE 802.3 standard. FIG. 2 is a diagram illustrating an LTP waveform 202 represented by the LTP signal S_LTP generated from the LTP generator circuit 106 shown in FIG. 1. The LTP waveform 202 is in compliance with an LTP template 204 defined by the IEEE 802.3 standard. For example, the LTP waveform 202 should be bounded between +3.1V with a width of no greater than 42 Bit Times (BT). In some embodiments of the present invention, the LTP signal S_LTP may be a fast link pulse (FLP) of AN or a normal link pulse (NLP) of 10BASE-T.

The TX circuit (which includes a TX DAC & Driver 108) receives the LTP signal S_LTP generated from the LTP generator circuit 106, and transmits a corresponding medium dependent interface (MDI) signal over an Ethernet cable (which is a twisted-pair cable) 103. In a case where a link is successfully established between the local device 102 and the remote device 104, the RX circuit (which includes an RX VGA & Slicer 118) of the remote device 104 receives an MDI signal from the Ethernet cable 103, and obtains the LTP signal S_LTP sent from the local device 102. Since a test signal needed by the proposed real-time Ethernet cable diagnosis function is the LTP signal S_LTP that is compliant with the IEEE 802.3 standard, the proposed real-time Ethernet cable diagnosis function can perform cable diagnosis without affecting normal operations of the IEEE 802.3 Ethernet network system 100.

It is possible that the Ethernet cable 103 may be damaged due to open or short circuit. The local device 102 can enable the proposed real-time Ethernet cable diagnosis function to identify a cable status of the Ethernet cable 103 and/or a position of a cable problem (e.g., open circuit or short circuit) of the Ethernet cable 103. When the proposed real-time Ethernet cable diagnosis function is enabled, the hybrid circuit 110 is active for enabling simultaneous TX and RX (i.e., duplex communication) over the same twisted pair of the Ethernet cable 103. Specifically, since the hybrid circuit 110 supports hybrid transmission (i.e., simultaneous TX and RX), a reflected LTP signal that is caused by open circuit, short circuit or impedance mismatch can be received through the loopback feedback transmission of the LTP signal S_LTP after the LTP signal S_LTP is sent over the Ethernet cable 103. If the local device 102 is a 1000BASE-T or 2500BASE-T device, the Ethernet physical layer (PHY) already supports hybrid transmission, and there is no extra hardware requirement to implement the proposed real-time Ethernet cable diagnosis function. In this embodiment, the RX circuit (which includes an RX VGA & Slicer 112) of the local device 102 is arranged to receive an RX signal S_RX from the hybrid circuit 110 during a period in which the LTP signal S_LTP is transmitted through the hybrid circuit 110. In this way, the real-time Ethernet cable diagnosis can be achieved through analyzing signal characteristics of the RX signal S_RX.

Figure 3:
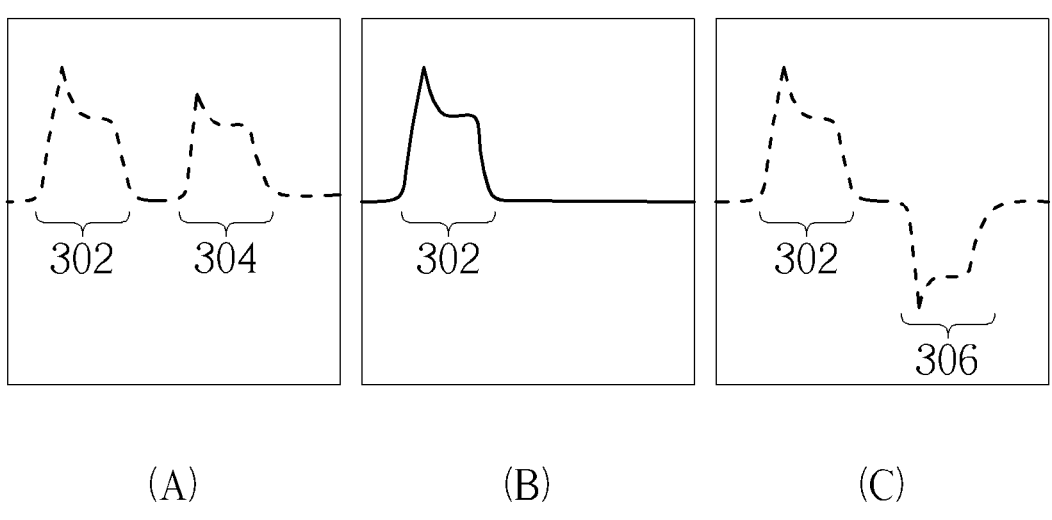
FIG. 3 is a diagram illustrating waveforms represented by the RX signal S_RX under a condition that echo cancellation is not enabled/used (HYBRID_EC=off) according to an embodiment of the present invention.

It should be noted that, no matter whether echo cancellation is enabled/used, the proposed real-time Ethernet cable diagnosis function can work normally. FIG. 3 is a diagram illustrating waveforms represented by the RX signal S_RX under a condition that echo cancellation is not enabled/used (HYBRID_EC=off) according to an embodiment of the present invention. In this case, the multiplexer 118 controlled by HYBRID_EC=off selects an analog signal S1 as an input of the RX circuit (which includes the RX VGA & Slicer 112) of the local device 102. Regarding a case where the cable status is OPEN (i.e., the Ethernet cable 103 is an open circuit), the RX signal S_RX includes an echo signal 302 generated at the time the LTP signal S_LTP is transmitted through the hybrid circuit 110, and a positive reflected signal 304 generated from reflection of the LTP signal S_LTP due to the open circuit with high impedance, as illustrated in the sub-diagram (A) of FIG. 3. Regarding a case where the cable status is SHORT (i.e., the Ethernet cable 103 is a short circuit), the RX signal S_RX includes an echo signal 302 generated at the time the LTP signal S_LTP is transmitted through the hybrid circuit 110, and a negative reflected signal 306 generated from reflection of the LTP signal S_LTP due to a short circuit with low impedance, as illustrated in the sub-diagram (C) of FIG. 3. Regarding a case where the cable status is LOAD (i.e., the Ethernet cable 103 is a load circuit), the RX signal S_RX includes an echo signal 302 generated at the time the LTP signal S_LTP is transmitted through the hybrid circuit 110, and includes no reflected signal generated from reflection of the LTP signal S_LTP due to impedance match between the local device 102 and the remote device 104, as illustrated in the sub-diagram (B) of FIG. 3.

Figure 4:
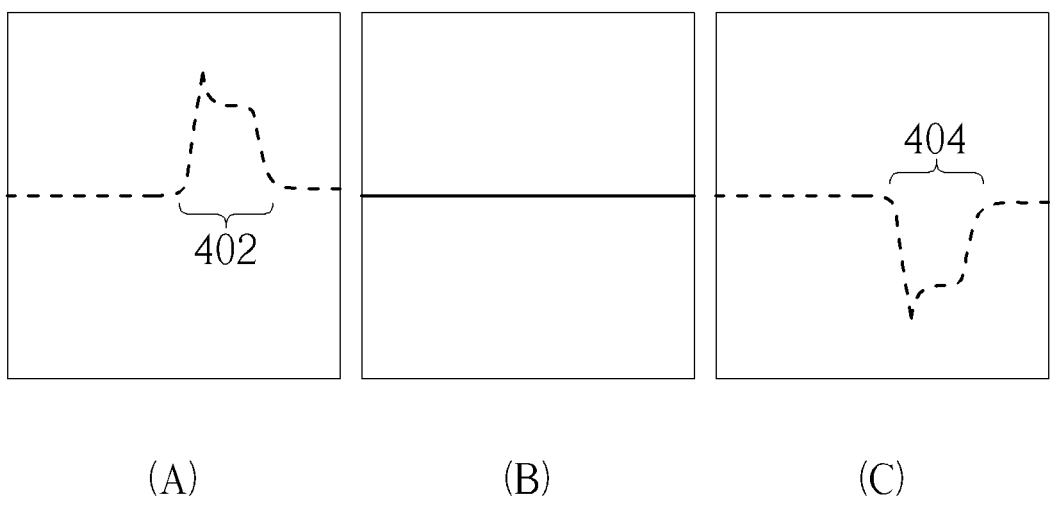
FIG. 4 is a diagram illustrating waveforms represented by the RX signal S_RX under a condition that echo cancellation is enabled/used (HYBRID_EC=on) according to an embodiment of the present invention.

FIG. 4 is a diagram illustrating waveforms represented by the RX signal S_RX under a condition that echo cancellation is enabled/used (HYBRID_EC=on) according to an embodiment of the present invention. In this case, the multiplexer 118 controlled by HYBRID_EC=on selects an analog signal S2 as an input of the RX circuit (which includes the RX VGA & Slicer 112) of the local device 102. Regarding a case where the cable status is OPEN (i.e., the Ethernet cable 103 is an open circuit), the RX signal S_RX includes no echo signal generated at the time the LTP signal S_LTP is transmitted through the hybrid circuit 110, and includes a positive reflected signal 402 generated from reflection of the LTP signal S_LTP due to the open circuit with high impedance, as illustrated in the sub-diagram (A) of FIG. 4. Regarding a case where the cable status is SHORT (i.e., the Ethernet cable 103 is a short circuit), the RX signal S_RX includes no echo signal generated at the time the LTP signal S_LTP is transmitted through the hybrid circuit 110, and includes a negative reflected signal 404 generated from reflection of the LTP signal S_LTP due to the short circuit with low impedance, as illustrated in the sub-diagram (C) of FIG. 4. Regarding a case where the cable status is LOAD (i.e., the Ethernet cable 103 is a load circuit), the RX signal S_RX includes no echo signal generated at the time the LTP signal S_LTP is transmitted through the hybrid circuit 110, and includes no reflected signal generated from reflection of the LTP signal S_LTP due to impedance match between the local device 102 and the remote device 104, as illustrated in the sub-diagram (B) of FIG. 4.

The proposed real-time Ethernet cable diagnosis function can work normally when the RX signal S_RX has any of the waveforms shown in FIG. 3 and FIG. 4. The post-processing circuit 114 is arranged to perform a cable diagnosis of the Ethernet cable 103 according to the RX signal S_RX. The operation of the proposed real-time Ethernet cable diagnosis function may be divided into a recording phase and an analysis phase, where the recording phase is used to record sample values of the RX signal S_RX (which is a digital signal representative of an RX waveform with/without echo cancellation), and the analysis phase is used to identify one or both of a cable status and a position (length) of a channel problem. In this embodiment, the total power of the observed RX waveform can be indicative of the cable status, and the timing of the reflection wave can be indicative of the position (length) of the channel problem. Further details of the proposed real-time Ethernet cable diagnosis function are described as below with reference to the accompanying drawings.

Figure 5:
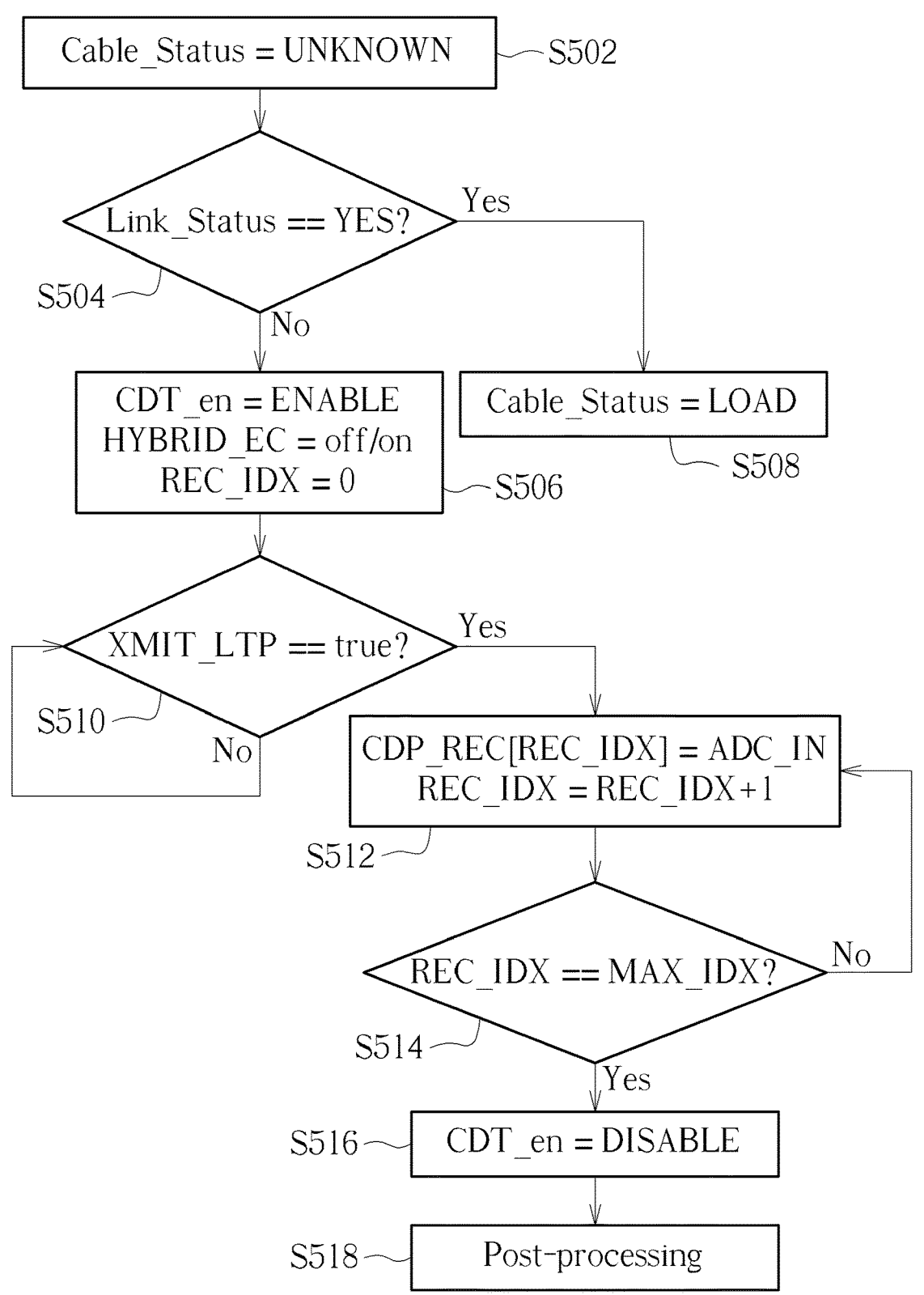
FIG. 5 is a flowchart illustrating a process of recording sample values of the RX signal S_RX for follow-up cable status identification according to an embodiment of the present invention.

FIG. 5 is a flowchart illustrating a process of recording sample values of the RX signal S_RX for follow-up cable status identification according to an embodiment of the present invention. The steps shown in FIG. 5 are performed by the post-processing circuit 114. Provided that the result is substantially the same, the steps are not required to be executed in the exact order shown in FIG. 5. At step S502, the cable status is unknown. At step S504, the post-processing circuit 114 checks if a link has been successfully established between the local device 102 and the remote device 104. If the link status indicates that the link has been successfully established, the post-processing circuit 114 identifies the cable status as LOAD and terminates the process (step S508). If the link status indicates that the link is not successfully established yet, the post-processing circuit 114 performs initialization of the recording process (step S506), such that the recording process is enabled (CDT_en=ENABLE), the hybrid echo cancellation circuit 116 can be enabled/used or disabled/bypassed (HYBRID_EC=off/on), and a recording index REC_IDX is initialized by a default value (REC_IDX=0). At step S510, the post-processing circuit 114 checks if transmission of the LTP signal S_LTP is started by checking status of one or more relevant signals, such as signal XMIT_LTP. When the status of signal XMIT_LTP is true, indicating that the transmission of the LTP signal S_LTP is started, the post-processing circuit 114 starts to record sample values CDP_REC[REC_IDX] of the RX signal S_RX that are digital values ADC_IN sequentially output from the RX circuit (which includes RX VGA & Slicer 112) of the local device 102, and does not stop the recording process until the recording index REC_IDX reaches a maximum value MAX_IDX (steps S512 and S514). After the sample values CDP_REC[0]-CDP_REC[MAX_IDX−1] are recorded (i.e., the number of recorded sample values is equal to MAX_IDX), the post-processing circuit 114 disables the recording process (CDT_en=DISABLE), and enables the follow-up post-processing for cable status identification (steps S516 and S518).

Figure 6:
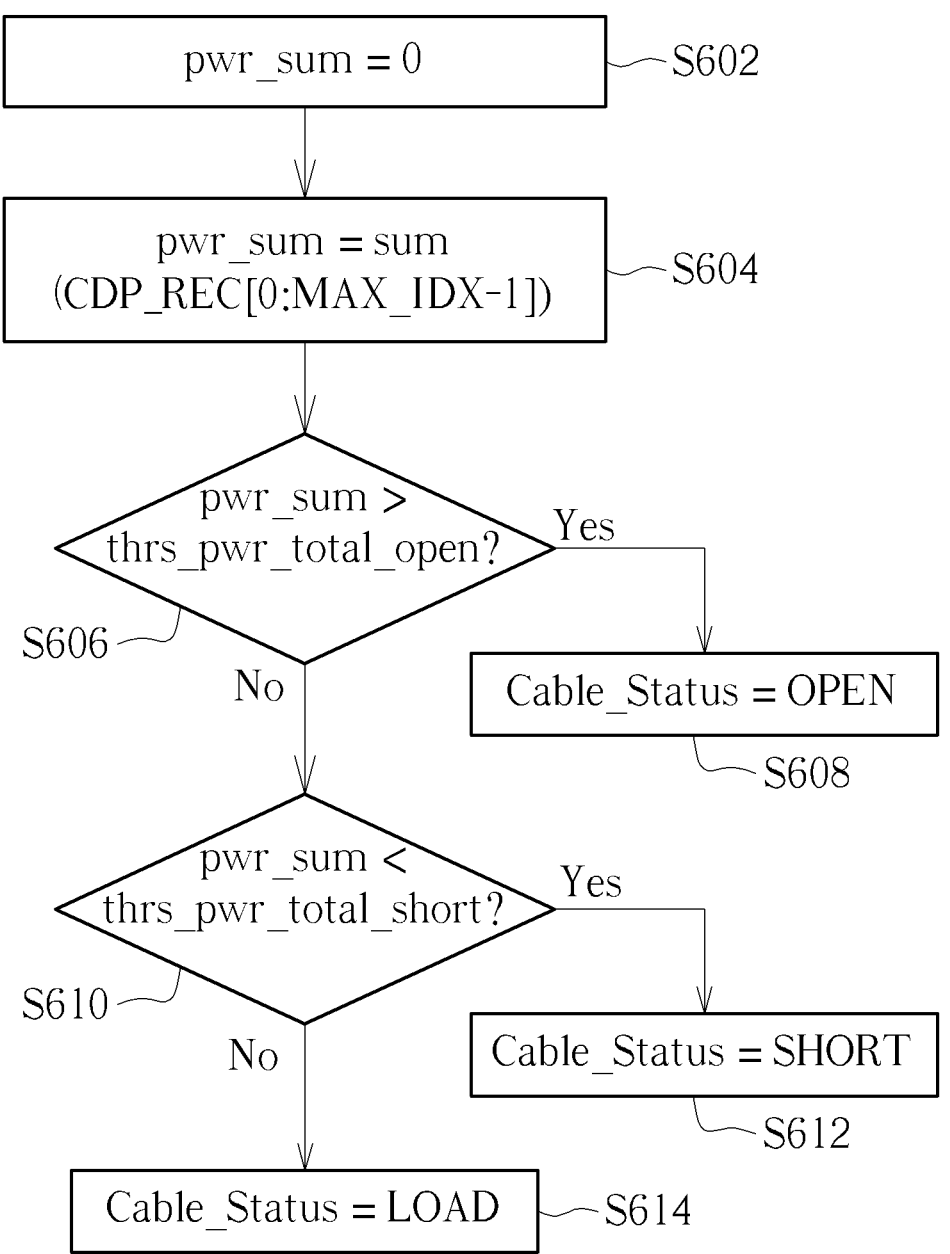
FIG. 6 is a flowchart illustrating a process of post-processing recorded sample values of the RX signal S_RX for cable status identification according to an embodiment of the present invention.

FIG. 6 is a flowchart illustrating a process of post-processing recorded sample values of the RX signal S_RX for cable status identification according to an embodiment of the present invention. The steps shown in FIG. 6 are performed by the post-processing circuit 114. Provided that the result is substantially the same, the steps are not required to be executed in the exact order shown in FIG. 6. At step S602, an accumulation result pwr_sum is initialized by a default value (pwr_sum=0). At step S604, the post-processing circuit 114 accumulates the sample values CDP_REC [0]-CDP_REC[MAX_IDX−1] as an estimate of the total power of the observed RX signal S_RX, and updates the accumulation result pwr_sum (pwr_sum=sum (CDP_REC [0: MAX_IDX−1])). At step S606, the post-processing circuit 114 compares the accumulation result pwr_sum and a pre-defined threshold thrs_pwr_total_open. When the accumulation result pwr_sum is larger than the pre-defined threshold thrs_pwr_total_open, the post-processing circuit 114 identifies the cable status as OPEN (step S608). When the accumulation result pwr_sum is not larger than the pre-defined threshold thrs_pwr_total_open, the post-processing circuit 114 compares the accumulation result pwr_sum and another pre-defined threshold thrs_pwr_total_short (step S610). When the accumulation result pwr_sum is smaller than the pre-defined threshold thrs_pwr_total_short, the post-processing circuit 114 identifies the cable status as SHORT (step S612). When the accumulation result pwr_sum is not smaller than the pre-defined threshold thrs_pwr_total_short, the post-processing circuit 114 identifies the cable status as LOAD (step S614).

The accumulation result pwr_sum obtained under a condition that the RX signal S_RX is received from the hybrid circuit 110 without echo cancellation involved in generation of the RX signal would be larger than the accumulation result pwr_sum obtained under a condition that the RX signal S_RX is received from the hybrid circuit 110 with echo cancellation involved in generation of the RX signal. Regarding a condition that the RX signal S_RX is received from the hybrid circuit 110 without echo cancellation involved in generation of the RX signal, a first value V1 is assigned to the pre-defined threshold thrs_pwr_total_open and a second value V2 (V2<V1) is assigned to the pre-defined threshold thrs_pwr_total_short. Regarding a condition that the RX signal S_RX is received from the hybrid circuit 110 with echo cancellation involved in generation of the RX signal, a third value V3 (V3<V1) is assigned to the pre-defined threshold thrs_pwr_total_open and a fourth value V4 (V4<V2) is assigned to the pre-defined threshold thrs_pwr_total_short.

It should be noted that the flow shown in FIG. 6 is for illustrative purposes only, and is not meant to be a limitation of the present invention. In practice, any means capable of achieving cable status identification by checking recorded sample values of the RX signal S_RX (which is received from the hybrid circuit 110 during a period in which the IEEE 802.3 compliant LTP signal S_LTP is transmitted through the hybrid circuit 110) falls within the scope of the present invention.

Figure 7:
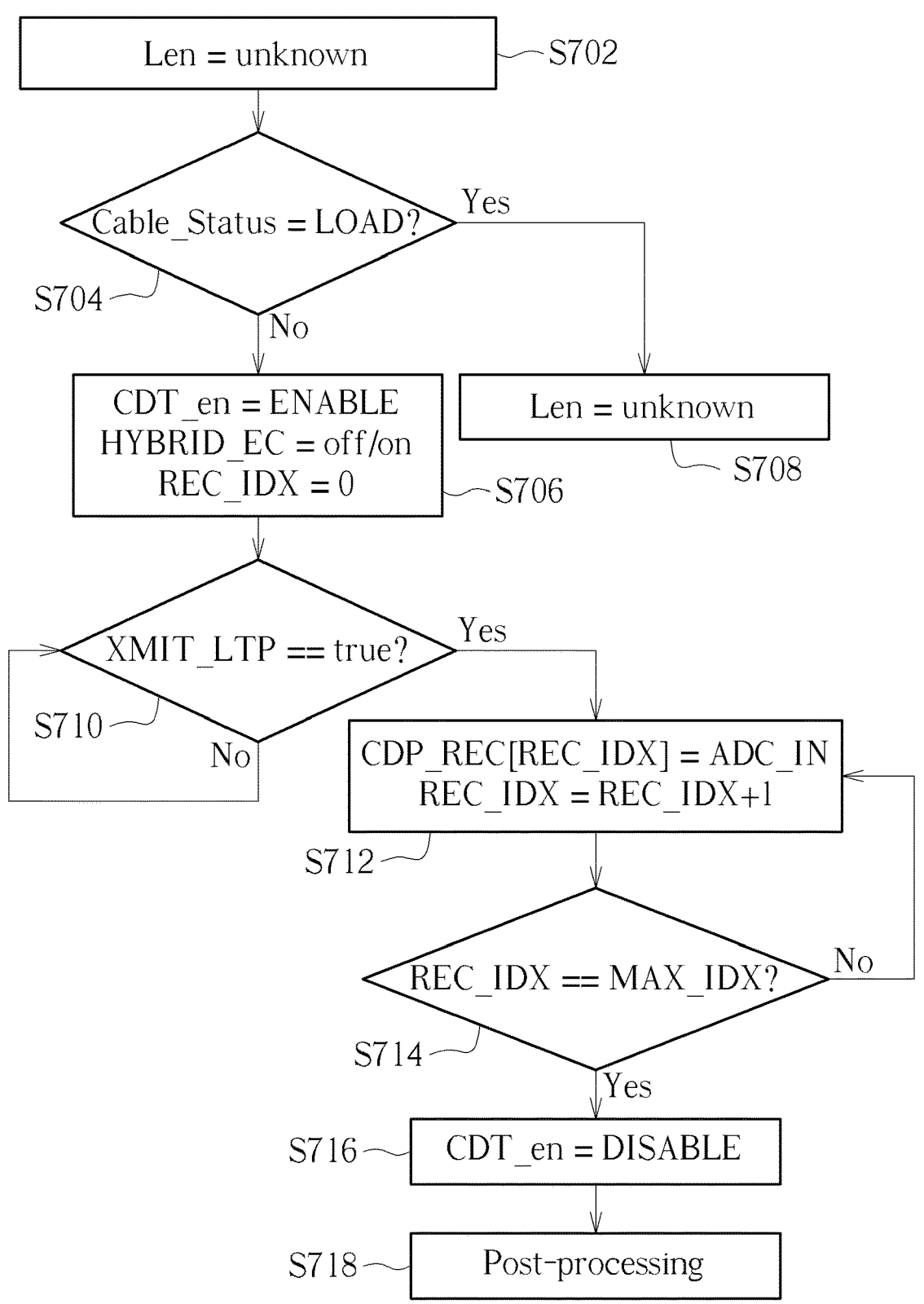
FIG. 7 is a flowchart illustrating a process of recording sample values of the RX signal S_RX for follow-up position detection according to an embodiment of the present invention.

In addition to identifying a cable status of the Ethernet cable 103, the proposed real-time Ethernet cable diagnosis function can identify a position (length) of a cable problem of the Ethernet cable 103. FIG. 7 is a flowchart illustrating a process of recording sample values of the RX signal S_RX for follow-up position detection according to an embodiment of the present invention. The steps shown in FIG. 7 are performed by the post-processing circuit 114. Provided that the result is substantially the same, the steps are not required to be executed in the exact order shown in FIG. 7. At step S702, the length is unknown. At step S704, the post-processing circuit 114 checks if a link has been successfully established between the local device 102 and the remote device 104. If the link status indicates that the link has been successfully established, the post-processing circuit 114 determines that the length is unknown and terminates the process (step S708). If the link status indicates that the link is not successfully established yet, the post-processing circuit 114 performs initialization of the recording process (step S706), such that the recording process is enabled (CDT_en=ENABLE), the hybrid echo cancellation circuit 116 can be enabled/used or disabled/bypassed (HYBRID_EC=off/on), and a recording index REC_IDX is initialized by a default value (REC_IDX=0). At step S710, the post-processing circuit 114 checks if transmission of the LTP signal S_LTP is started by checking status of one or more relevant signals, such as signal XMIT_LTP. When the status of signal XMIT_LTP is true, indicating that the transmission of the LTP signal S_LTP is started, the post-processing circuit 114 starts to record sample values CDP_REC[REC_IDX] of the RX signal S_RX that are digital values ADC_IN sequentially output from the RX circuit (which includes RX VGA & Slicer 112), and does not stop the recording process until the recording index REC_IDX reaches a maximum value MAX_IDX (steps S712 and S714). After the sample values CDP_REC[0]-CDP_REC[MAX_IDX−1] are recorded (i.e., the number of recorded sample values is equal to MAX_IDX), the post-processing circuit 114 disables the recording process (CDT_en=DISABLE), and enables the follow-up post-processing for position detection of the cable problem (steps S716 and S718). In some embodiments of the present invention, the sample values CDP_REC[0]-CDP_REC[MAX_IDX−1] recorded for cable status identification as illustrated in FIG. 5 may be reused for position detection as illustrated in FIG. 7.

Figure 8:
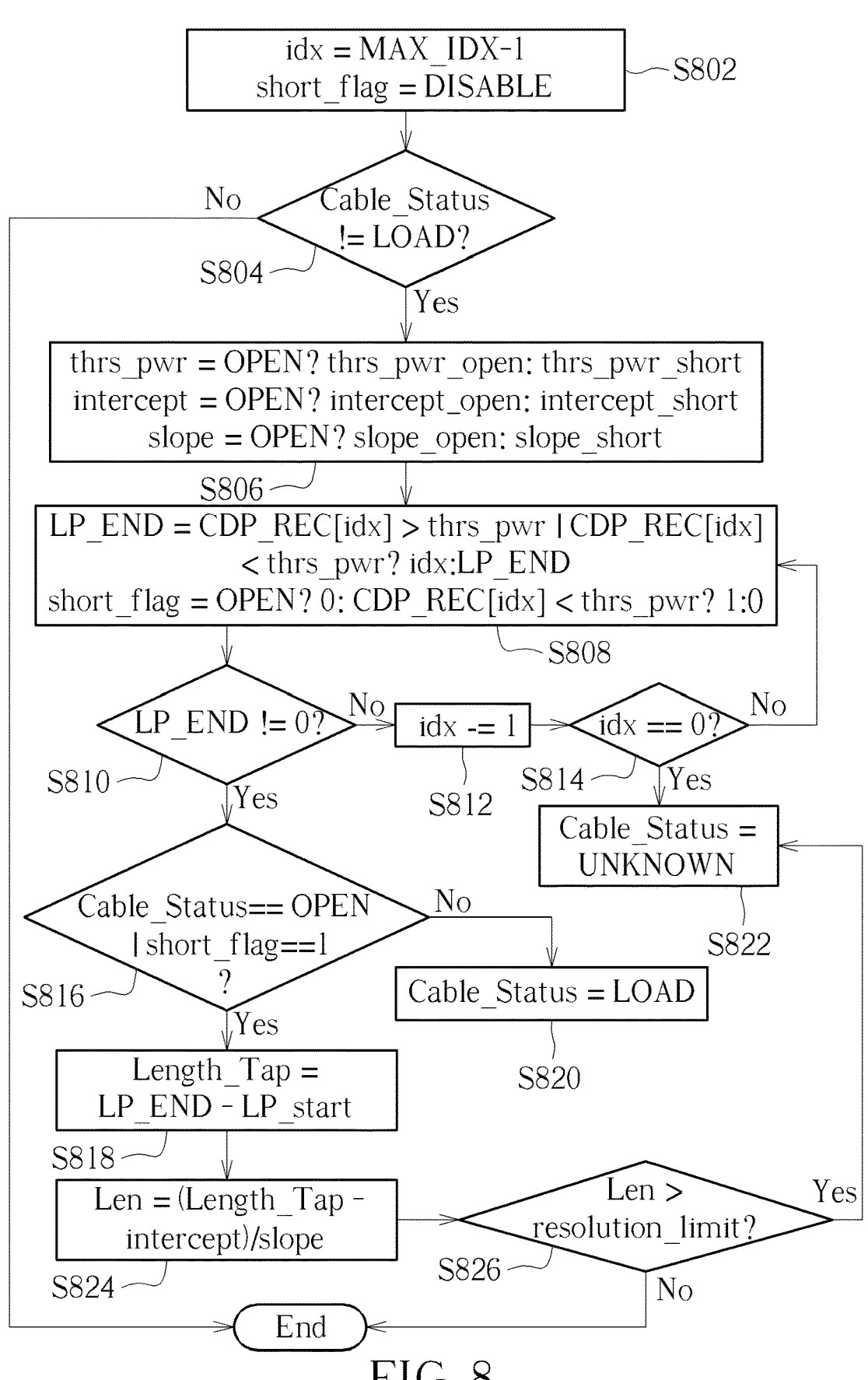
FIG. 8 is a flowchart illustrating a process of post-processing recorded sample values of the RX signal S_RX for position detection of the cable problem according to an embodiment of the present invention.

FIG. 8 is a flowchart illustrating a process of post-processing recorded sample values of the RX signal S_RX for position detection of the cable problem according to an embodiment of the present invention. The steps shown in FIG. 8 are performed by the post-processing circuit 114. Provided that the result is substantially the same, the steps are not required to be executed in the exact order shown in FIG. 8. The RX signal S_RX includes sample values CDP_REC[0], CDP_REC[1], . . . , CDP_REC[MAX_IDX−2], CDP_REC[MAX_IDX−1] at different time instances in a forward direction. That is, a time instance at which a sample value CDP_REC[m] is obtained is later than a time instance at which a sample value CDP_REC[n] is obtained, where m is larger than n. The post-processing circuit 114 is arranged to identify a position of a cable problem (e.g., open circuit or short circuit) of the Ethernet cable 103 through sequentially checking sample values CDP_REC[0]-CDP_REC[MAX_IDX−1] in a backward direction. That is, the post-processing circuit 114 checks the sample value CDP_REC[m] before checking the sample value CDP_REC[n] (m>n), and the first checked sample value is CDP_REC[MAX_IDX−1].

The post-processing circuit 114 performs initialization of the position detection process at step S802, such that an index idx is initialized by a default value (idx=MAX_IDX−1), and a flag short_flag is initialized by a default setting (short_flag=DISABLE). At step S804, the post-processing circuit 114 checks if the cable status is LOAD. When the cable status is OPEN or SHORT, the Ethernet cable 103 has a cable problem (e.g., open circuit or short circuit), and the flow proceeds with step S806. At step S806, the post-processing circuit 114 sets up a plurality of parameters (e.g., thrs_pwr, intercept, and slope) according to the cable status. Specifically, the differential of the reflected signal from the local device 102 to the position of impedance mismatch can be used for open-circuit/short-circuit position diagnosis. In this embodiment, when the cable status is OPEN, the parameter thrs_pwr is set by a pre-defined value (thrs_pwr=thrs_pwr_open), the parameter intercept is set by a pre-defined value (intercept=intercept_open), and the parameter slope is set by a pre-defined value (slope=slope_open); and when the cable status is SHORT, the parameter thrs_pwr is set by a pre-defined value (thrs_pwr=thrs_pwr_short), the parameter intercept is set by a pre-defined value (intercept=intercept_short), and the parameter slope is set by a pre-defined value (slope=slope_short).

As mentioned above, when echo cancellation is enabled/used (HYBRID_EC=on), the RX signal S_RX includes no echo signal resulting from local device's TX operation; and when echo cancellation is disabled/bypassed (HYBRID_EC=off), the RX signal S_RX includes an echo signal resulting from local device's TX operation. Hence, in some embodiments of the present invention, the pre-defined values thrs_pwr_open and thrs_pwr_short may depend on the echo cancellation on/off status. For example, the pre-defined values thrs_pwr_open and thrs_pwr_short may be set by normal values when echo cancellation is enabled/used (HYBRID_EC=on), and may be set by bigger values when echo cancellation is disabled/bypassed (HYBRID_EC=off). However, this is for illustrative purposes only, and is not meant to be a limitation of the present invention.

Figure 9:
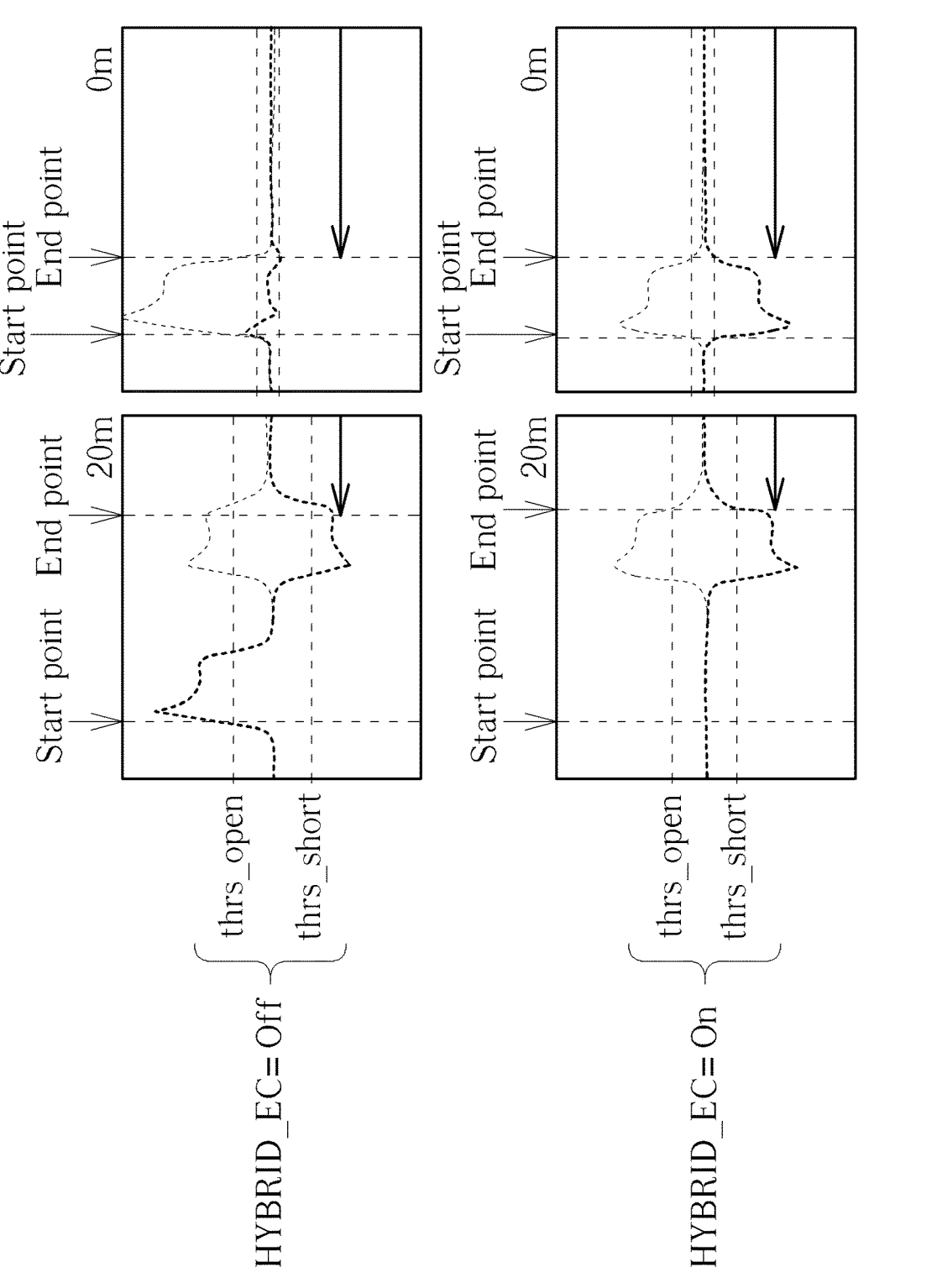
FIG. 9 is a diagram illustrating a comparison of waveforms of the RX signal S_RX obtained for different positions (lengths) of the cable problem.

FIG. 9 is a diagram illustrating a comparison of waveforms of the RX signal S_RX obtained for different positions (lengths) of the cable problem. Without echo cancellation, a positive reflected signal of an open circuit is not interfered with the echo signal when the position of the cable problem is at a long distance (e.g., 20 m), and a negative reflected signal of short circuit is not interfered with the echo signal when the position of the cable problem is at a long distance (e.g., 20 m). With echo cancellation, a positive reflected signal of an open circuit under a condition that the position of the cable problem is at a long distance (e.g., 20 m) is symmetric to a negative reflected signal of a short circuit under a condition that the position of the cable problem is at a long distance (e.g., 20 m). With echo cancellation, a positive reflected signal of an open circuit under a condition that the position of the cable problem is at a short distance (e.g., 0m) is symmetric to a negative reflected signal of a short circuit under a condition that the position of the cable problem is at a short distance (e.g., 0m), which allows the parameter thrs_pwr to be set by a normal value. However, without echo cancellation, a positive reflected signal of an open circuit is constructive with the echo signal when the position of the cable problem is at a short distance (e.g., 0m), which results in more total power of the observed signal; and a negative reflected signal of a short circuit is deconstructive with the echo signal when the position of the cable problem is at a short distance (e.g., 0m), which results in less total power of the observed signal. Hence, in some embodiments of the present invention, the parameter thrs_pwr may be set by a smaller value for identifying the position of the cable problem when cable status is SHORT and echo cancellation is disabled/bypassed (HYBRID_EC=off). However, this is for illustrative purposes only, and is not meant to be a limitation of the present invention.

The start point LP start of the LTP signal S_LTP is static, and the end point LP_END of the reflected signal in the RX signal S_RX corresponds to the length. At step S808, the post-processing circuit 114 tries to find the end point LP_END by checking certain criteria. As mentioned above, the post-processing circuit 114 identifies a position of a cable problem of the Ethernet cable 103 through sequentially checking sample values CDP_REC[MAX_IDX−1], CDP_REC[MAX_IDX−2], . . . , CDP_REC[1], CDP_REC [0]. Hence, the post-processing circuit 114 first checks if the last recorded sample value CDP_REC[MAX_IDX−1] is larger than the threshold thrs_pwr or smaller than the threshold thrs_pwr. If the recorded sample value CDP_REC [MAX_IDX−1] is neither larger than the threshold thrs_pwr nor smaller than the threshold thrs_pwr, the end point LP_END is not updated by the current index idx=MAX_IDX−1, and remains a default value (e.g., LP_END=0). Since the end point LP_END is not a non-zero value, the post-processing circuit 114 updates the index idx by a decrement value −1 (steps S810 and S812). At step S814, the post-processing circuit 114 checks if the updated index idx reaches zero. When the updated index idx reaches zero, the post-processing circuit 114 identifies the cable status as UNKNOWN (step S822). When the updated index idx does not reach zero, the post-processing circuit 114 performs step S808 to check the next recorded sample value CDP_REC[MAX_IDX−2].

When the post-processing circuit 114 finds that a current sample value CDP_REC[idx] is larger than the threshold thrs_pwr or smaller than the threshold thrs_pwr, the current sample value CDP_REC[idx] is identified as the end point of the reflected signal that results from reflection of the LTP signal S_LTP, the end point LP_END is updated by the index idx, and the flag short_flag is updated according to certain criteria. In this embodiment, the flag short_flag is used to prevent status misjudgment under a condition that total power of the observed RX signal in the LOAD state is smaller than thrs_pwr_total_short. Specifically, the flag short_flag is used to prevent status misjudgment when the cable status is LOAD and the current sample value CDP_REC[idx] is smaller than the threshold thrs_pwr. In this embodiment, when the cable status is OPEN, the flag short_flag is set by 0; when the cable status is not OPEN and the current sample value CDP_REC[idx] is not smaller than the threshold thrs_pwr, the flag short_flag is set by 0 and the cable status is modified to SHORT; and when the cable status is not OPEN and the current sample value CDP_REC [idx] is smaller than the threshold thrs_pwr, the flag short_flag is set by 1.

When the end point LP_END is a non-zero value, the post-processing circuit 114 checks if the cable status is OPEN or the flag short_flag is set by 1 (step S816). When the cable status is SHORT and the flag short_flag is set by 0, the post-processing circuit 114 identifies the cable status as LOAD (step S820). When the cable status is OPEN or the flag short_flag is set by 1 (which implies that the cable status is SHORT and the current sample value CDP_REC[idx] is smaller than the threshold thrs_pwr), the post-processing circuit 114 calculates a length tap (step S818), and then calculates the length (which is indicative of a position of a cable problem) according to the length tap and the parameters intercept and slope (step S824). At step S826, the post-processing circuit 114 further checks if the length obtained at step S824 exceeds a resolution limit. If the length exceeds the resolution limit, the post-processing circuit 114 identifies the cable status as UNKNOWN (step S822).

It should be noted that the flow shown in FIG. 8 is for illustrative purposes only, and is not meant to be a limitation of the present invention. In practice, any means capable of achieving position detection by checking recorded sample values of the RX signal S_RX (which is received from the hybrid circuit 110 during a period in which the IEEE 802.3 compliant LTP signal S_LTP is transmitted through the hybrid circuit 110) falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An Ethernet device comprising:
   a link test pulse (LTP) generator circuit, arranged to generate an LTP signal that is compliant with an IEEE 802.3 standard;
   a hybrid circuit;
   a transmit (TX) circuit, arranged to transmit the LTP signal to an Ethernet cable through the hybrid circuit;
   a receive (RX) circuit, arranged to receive an RX signal from the hybrid circuit during a period in which the LTP signal is transmitted through the hybrid circuit; and
   a post-processing circuit, arranged to perform a cable diagnosis of the Ethernet cable according to the RX signal;
   wherein the RX signal comprises a plurality of sample values at different time instances, and the post-processing circuit is arranged to accumulate the sample values to generate an accumulation result, and identify a cable status of the Ethernet cable according to the accumulation result.

2. The Ethernet device of claim 1, wherein the LTP signal is a fast link pulse (FLP) of Auto-Negotiation (AN) or a normal link pulse (NLP) of 10BASE-T.

3. The Ethernet device of claim 1, wherein the post-processing circuit is arranged to compare the accumulation result and a pre-defined threshold to identify the cable status of the Ethernet cable.

4. The Ethernet device of claim 1, wherein the RX signal is received from the hybrid circuit with echo cancellation involved in generation of the RX signal.

5. The Ethernet device of claim 1, wherein the RX signal is received from the hybrid circuit without echo cancellation involved in generation of the RX signal.

6. An Ethernet device comprising:
   a link test pulse (LTP) generator circuit, arranged to generate an LTP signal that is compliant with an IEEE 802.3 standard;
   a hybrid circuit;
   a transmit (TX) circuit, arranged to transmit the LTP signal to an Ethernet cable through the hybrid circuit;
   a receive (RX) circuit, arranged to receive an RX signal from the hybrid circuit during a period in which the LTP signal is transmitted through the hybrid circuit; and
   a post-processing circuit, arranged to perform a cable diagnosis of the Ethernet cable according to the RX signal;
   wherein the RX signal comprises a plurality of sample values at different time instances in a forward direction, and the post-processing circuit is arranged to identify a position of a cable problem of the Ethernet cable through sequentially checking sample values of the RX signal in a backward direction.

7. The Ethernet device of claim 6, wherein the post-processing circuit is arranged to sequentially check the sample values of the RX signal in the backward direction by comparing each of the sample values and a pre-defined threshold.

8. The Ethernet device of claim 6, wherein the RX signal is received from the hybrid circuit with echo cancellation involved in generation of the RX signal.

9. The Ethernet device of claim 6, wherein the RX signal is received from the hybrid circuit without echo cancellation involved in generation of the RX signal.

10. An Ethernet cable diagnosis method comprising:

generating a link test pulse (LTP) signal that is compliant with an IEEE 802.3 standard;

transmitting the LTP signal to an Ethernet cable through a hybrid circuit;

receiving a receive (RX) signal from the hybrid circuit during a period in which the LTP signal is transmitted through the hybrid circuit; and performing a cable diagnosis of the Ethernet cable according to the RX signal;

wherein the RX signal comprises a plurality of sample values at different time instances, and performing the cable diagnosis of the Ethernet cable according to the RX signal comprises:

accumulating the sample values to generate an accumulation result; and identifying a cable status of the Ethernet cable according to the accumulation result.

11. The Ethernet cable diagnosis method of claim 10, wherein the LTP signal is a fast link pulse (FLP) of Auto-Negotiation (AN) or a normal link pulse (NLP) of 10BASE-T.

12. The Ethernet cable diagnosis method of claim 10, wherein identifying the cable status of the Ethernet cable according to the accumulation result comprises:

comparing the accumulation result and a pre-defined threshold to identify the cable status of the Ethernet cable.

13. The Ethernet cable diagnosis method of claim 10, wherein the RX signal is received from the hybrid circuit with echo cancellation involved in generation of the RX signal.

14. The Ethernet cable diagnosis method of claim 10, wherein the RX signal is received from the hybrid circuit without echo cancellation involved in generation of the RX signal.

15. An Ethernet cable diagnosis method comprising:

generating a link test pulse (LTP) signal that is compliant with an IEEE 802.3 standard;

transmitting the LTP signal to an Ethernet cable through a hybrid circuit;

receiving a receive (RX) signal from the hybrid circuit during a period in which the LTP signal is transmitted through the hybrid circuit; and performing a cable diagnosis of the Ethernet cable according to the RX signal;

wherein the RX signal comprises a plurality of sample values at different time instances in a forward direction, and performing the cable diagnosis of the Ethernet cable according to the RX signal comprises:

identifying a position of a cable problem of the Ethernet cable through sequentially checking sample values of the RX signal in a backward direction.

16. The Ethernet cable diagnosis method of claim 15, wherein identifying the position of the cable problem of the Ethernet cable through sequentially checking sample values of the RX signal in a backward direction comprises:

comparing each of the sample values and a pre-defined threshold.

17. The Ethernet cable diagnosis method of claim 15, wherein the RX signal is received from the hybrid circuit with echo cancellation involved in generation of the RX signal.

18. The Ethernet cable diagnosis method of claim 15, wherein the RX signal is received from the hybrid circuit without echo cancellation involved in generation of the RX signal.

* * * * *